April 15, 1941.　　　A. C. MATHIESON　　　2,238,124
BRAKE
Filed Dec. 17, 1938　　　2 Sheets-Sheet 1
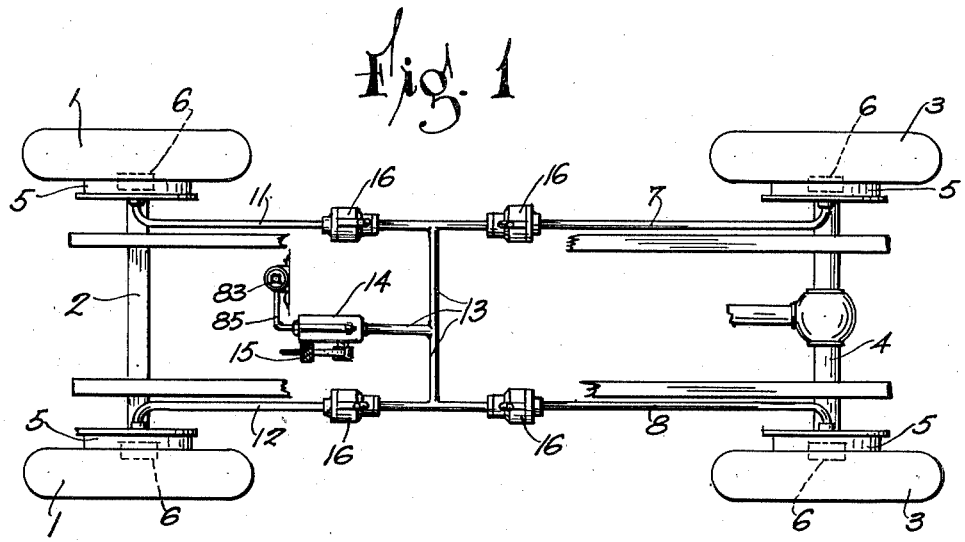
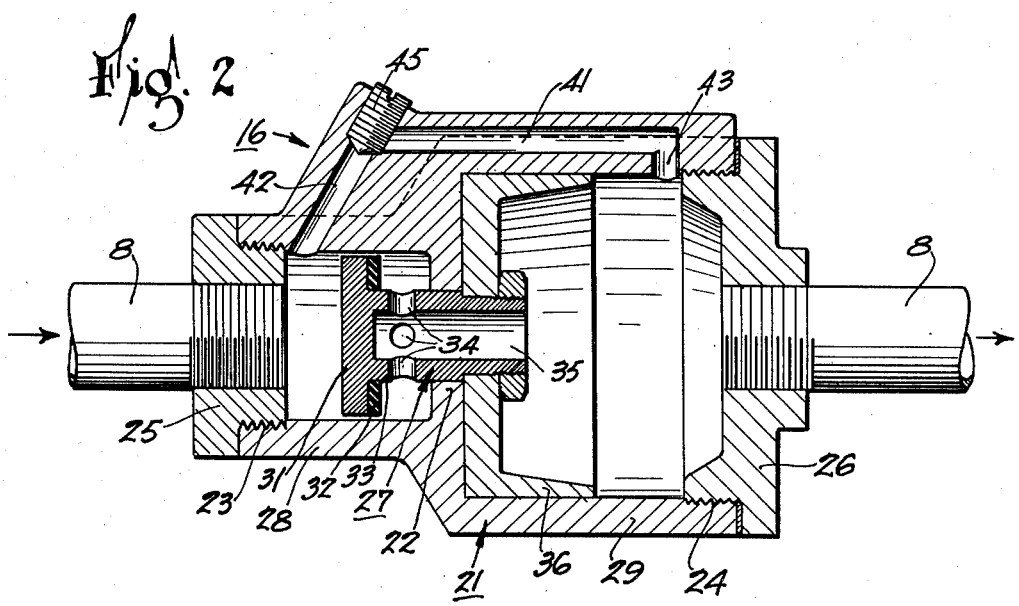
INVENTOR.
ANDREW C. MATHIESON
BY Jerome R. Cox
ATTORNEY.

April 15, 1941.   A. C. MATHIESON   2,238,124
BRAKE
Filed Dec. 17, 1938   2 Sheets-Sheet 2

INVENTOR.
ANDREW C. MATHIESON
BY Jerome R. Cox
ATTORNEY.

Patented Apr. 15, 1941

2,238,124

UNITED STATES PATENT OFFICE 2,238,124

BRAKE

Andrew C. Mathieson, South Bend, Ind., assignor to Bendix Aviation Corporation, South Bend, Ind., a corporation of Delaware Application December 17, 1938, Serial No. 246,360

3 Claims. (Cl. 303—84)

The invention in this application relates to hydraulic brakes and specifically to means for insuring that a hydraulic brake system may be safe in spite of the possible failure of a portion of the system.

Numerous patents have been obtained on inventions relating to devices for a similar purpose. Many of these devices provide a piston in each of the several separated lines which pistons, upon failure of one of the lines, moves to a position so that communication is cut off from the master cylinder to that line. For instance, in the patents to Herbst, Patent No. 1,578,824 and Claspy et al. Patent No. 1,993,873, such pistons are provided. In some devices of the types disclosed in these patents, a liquid tight seal is provided so that no liquid can pass the piston. In such cases, the piston must be able to move through a stroke long enough that allowance may be made for a full application of the brakes from an off position, adjusted when the brake lining is new, to a fully applied position after the brake is applied. In case of failure in such an arrangement, all of the liquid present for this relatively long stroke is lost with a consequent loss of pedal travel.

In other devices of the kind illustrated by the patents cited, slight amounts of fluid are allowed to pass the piston and the resistance to the passage of fluid is depended upon to move the piston and close the valve should a leak occur.

I have devised a device which combines the advantages of both of these systems. In my device, liquid is allowed to flow substantially freely past the piston when the brake is applied normally. In case of failure, however, I have provided improved and more positive means that insures that the valve closes at once so that the amount of liquid lost is almost negligible.

One object of my invention is therefore to provide means of insuring the safety of a hydraulic system.

A further object of the invention is to provide a safety device in which more positive means are arranged to close the valve upon loss of fluid or upon failure of the fluid lines.

A further object of the invention is to provide a device of this type having a piston formed with a relatively small face receiving pressure from the fluid coming from the inlet and a relatively large face receiving fluid on the outlet side.

A further object of my invention is to provide improved means of bleeding a hydraulic system having such a safety device incorporated.

Further objects and features of the invention should be apparent from a reading of the subjoined claims and from a consideration of the accompanying drawings, in which:

Figure 1 is a top plan view of a portion of a chassis of an automobile, illustrating the application of my invention;

Figure 2 is a view in vertical section of one of the safety devices illustrated in Figure 1;

Figure 3:
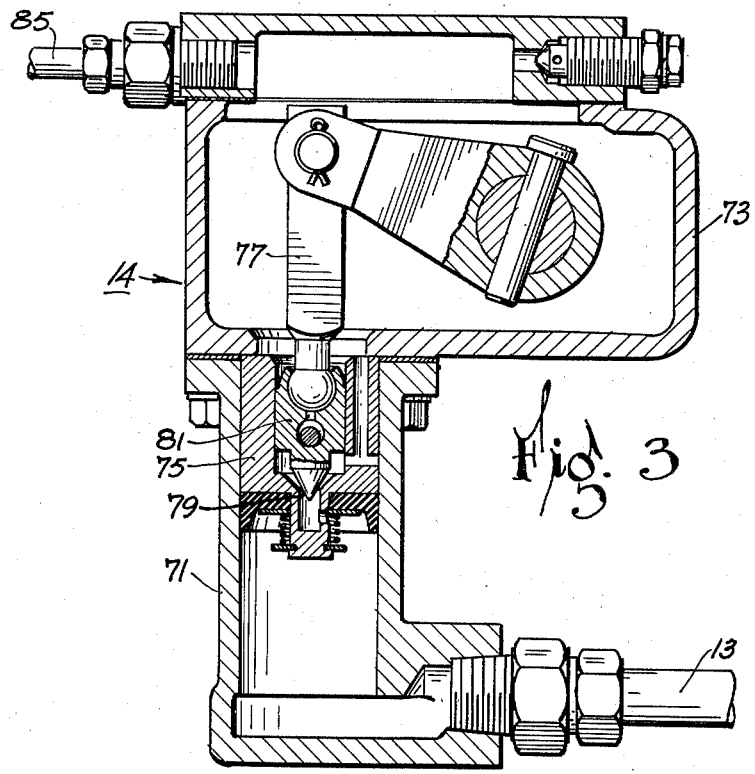
Figure 3 is a view in vertical section of the master cylinder shown in Figure 1.

Referring now in detail to the drawings, it may be seen that I have shown in Figure 1 the chassis of an automobile having road wheels 1 supporting an axle 2 for the forward portion of the automobile and road wheels 3 supporting the rear axle 4. Each road wheel is provided with a brake 5 arranged to be applied by a wheel cylinder 6. The rear wheel cylinders are connected by conduits 7 and 8 and the front wheel cylinders are connected by conduits 11 and 12 with a main conduit 13 connected to the master cylinder 14 which is arranged to be applied by a foot pedal 15. Interposed in each of the conduits 7, 8, 11 and 12 is a safety device 16.

Each of the safety devices 16 is similar and is illustrated more clearly in Figure 2. Each comprises a main casing 21 formed with a central partition 22 and internally threaded at its inlet end as at 23 and at its outlet end as at 24. The inlet end of the casing 21 is much smaller in diameter than the outlet end for purposes which will soon appear. Threaded into the inlet end is a plug 25 and threaded into the outlet end is a plug 26. Within the casing, there is positioned a piston 27. This piston is formed with two portions, the smaller within the reduced portion 28 of the casing 21 and the larger within the larger portion 29 of the casing 21. Within the reduced portion 28, the piston has a head or plunger 31 which is slightly smaller than the bore in the portion 28 so that fluid may flow past. On the inner face of this head or plunger 31, there is provided a packing 32 which is arranged in case of failure of the conduit connected to the outlet end of the casing to seal against the partition 22. Connected to the plunger 31 is a reduced stem 33 which is arranged to slide in the partition 22. The stem 33 fits the passage tightly so that normally no fluid passes through the partition except through the stem itself. This stem is provided with axial ports 34 by which the chamber in portion 28 is connected to a central passageway 35 in the stem 33. This central passageway extends through a large cup-shaped piston head or plunger 36 positioned in the chamber formed in portion 29 and is thus always connected to the portion 29. The plunger 36 is secured to the stem 33 by means of a nut 37 which holds the cup-shaped piston head or plunger against a shoulder formed on stem 33.

The casing 21 is formed with a longitudinal bore 41 connected to the chamber formed in portion 28 by an inclined bore 42 and connected to the chamber formed in portion 29 by an axial bore 43. A plug 45 normally screwed in the extension of the bore 42 separates bores 41 and 42 so that no liquid may pass normally.

The master cylinder 14 is shown in greater detail in Figure 3. It is formed with a cylinder portion 71 and a reservoir portion 73. The cylinder portion 71 is provided with a piston 75 which is actuated from the pedal 15 by a piston rod 77 when the brakes are applied, this actuation initially closing a passage 79 leading from the reservoir portion 73 to the cylinder portion 71 by the relative movement of a valve member 81. The reservoir portion is connected with an auxiliary reservoir 83 by a conduit 85.

In the normal operation of the brake system disclosed, liquid flows from the master cylinder through the main conduit and through each of the devices 16, then through the branch conduits to the wheel cylinders to apply the brakes. In flowing through devices 16, the liquid enters through the inlet plug 25 past the plunger 31, through the ports 34 and central passageway 35, and thence through the outlet plug 26. However, should one of the lines fail, pressure on the plunger 31 forces the piston 27 to the right for the reason that pressure on the large cup-shaped plunger 36 is relieved. Thereupon the packing 32 seals against the partition 22 and no further fluid may pass through that line. The fluid may pass the other devices 16 in the other conduits and apply the brakes at the other wheels.

In bleeding the hydraulic brake system, the plug 45 is loosened allowing the fluid to pass through the bores 41, 42 and 43 by-passing the piston 27 and forcing trapped air from the system. When the bleeding operation is accomplished, the screw 45 is returned to the position shown in the drawing.

Figure 4:
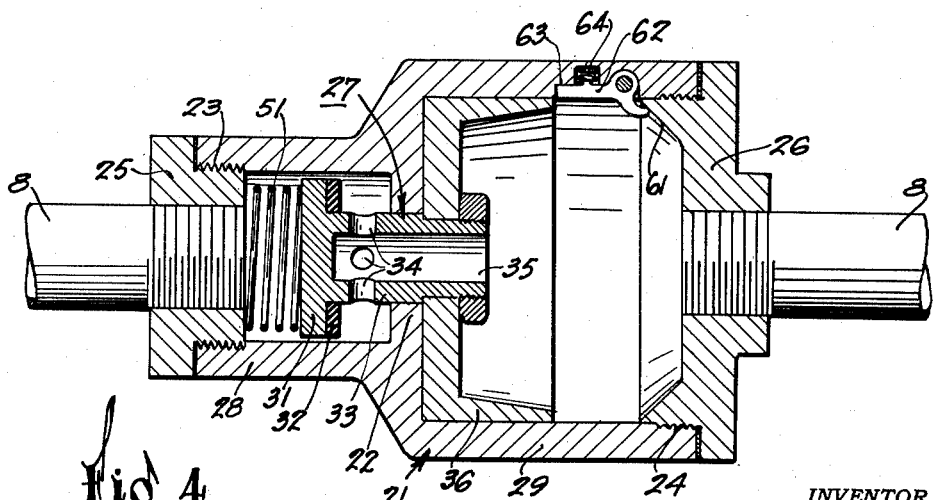
Figure 4 is a view similar to Figure 2 showing an alternate form of safety device.

In the modification shown in Figure 4, like parts are indicated by similar numerals. However, a light spring 51 is provided between plug 25 and piston 27 to insure the movement of the piston 27 immediately upon the failure of any portion of the system. The outlet plug 26 is formed with an annular cam 61 which normally holds a latch 62 against a spring 64 in the position shown in a recess 63 so that the plunger 36 of the piston 27 can move to the right to seal as previously described. However, in the bleeding operation, the plug 26 carrying cam 61 is loosened and thereupon the spring 64 moves the latch 62 out so that it contacts with the end of the plunger 36. Thus it holds the piston 27 against movement and the system may be bled with the liquid passing through the ports 34 and central passageway 35 in the piston.

It is to be understood that the above described embodiments of my invention are for the purpose of illustration only and various changes may be made therein without departing from the spirit and scope of the invention.

I claim:

1. A hydraulic brake system comprising a master cylinder, wheel cylinders, a plurality of conduits connecting said master cylinder and wheel cylinders, and a safety device in each of the conduits comprising a casing formed with cylinders of different diameters and with a partition between the cylinders and having arranged therein a piston device having parts of different diameters in said cylinders and having a connecting portion passing through said partition, said parts having opposed faces of different areas, said piston device having a passage therethrough normally connecting said cylinders, and said part of smaller diameter being provided with a packing arranged to seal upon said partition and contacting said partition on the side toward said master cylinder and closing said passage.

2. In a hydraulic brake system, a master cylinder, a plurality of wheel cylinders, conduits connecting said master cylinder to said wheel cylinders, a safety device in each of said conduits comprising a casing having therein a piston device provided with a passage therethrough normally connecting opposite ends of the casing and formed with means for at times sealing the opposite ends of the casing from one another, said means comprising a poppet valve formed by said piston and said cylinder, and said casing also being formed with a plurality of intersecting bores connecting said opposite ends of said cylinders, and a plug threaded into said casing and blocking connection between said intersecting bores.

3. In a hydraulic brake system, a master cylinder, a plurality of wheel cylinders, conduits connecting said master cylinder to said wheel cylinders, a safety device in each of said conduits comprising a casing having therein a piston device provided with a passage therethrough normally connecting opposite ends of the casing and formed with means for at times sealing the opposite ends of the casing from one another, said means comprising a poppet valve formed by said piston and said cylinder.

ANDREW C. MATHIESON.